RECORD CHANGER

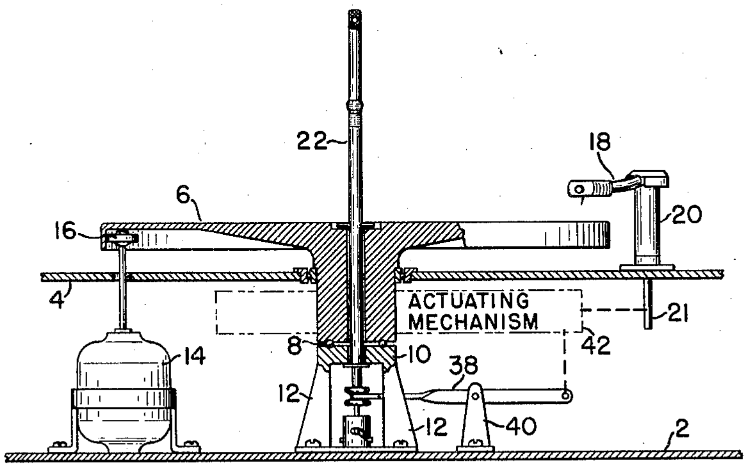
FIG. 1
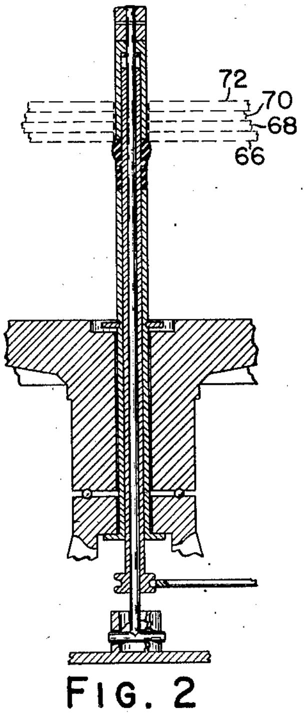
FIG. 2
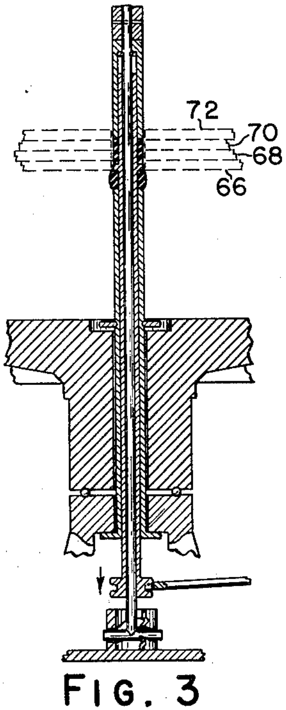
FIG. 3
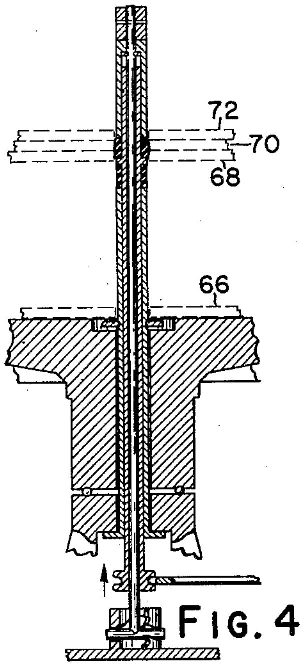
Inventor
GEORGE A. EXLEY
By Robert T. Killman
Attorney Feb. 20, 1951 G. A. EXLEY 2,542,759

Filed Aug. 7, 1946 2 Sheets-Sheet 2

Inventor

GEORGE A. EXLEY

By Robert T. Killman

Attorney

UNITED STATES PATENT OFFICE 2,542,759

RECORD CHANGER

George A. Exley, Baltimore, Md., assignor to Bendix Aviation Corporation, Towson, Md., a corporation of Delaware Application August 7, 1946, Serial No. 688,955

4 Claims. (Cl. 274—10)

This invention relates to phonographic record changers and more particularly to record changers of the type in which the records are played one-by-one in sequence from a stack of records.

Previously known record changers of this type are subject to a number of defects. Most of them involve mechanism of considerable complication, with a multiplicity of moving parts both above and below the turntable. Those portions above the turntable must be expensively finished by plating or other means in order that the device shall present a pleasing appearance. They must be adjusted for the dropping of different size records. The operation of their mechanism frequently requires considerable mechanical manipulation by the operator both in preparing the device for playing and in removal of played records. The record holding mechanisms also frequently mutilate or disfigure records during the record changing operation.

It is an object of this invention to provide a record changer which is rugged and of simple construction, occupying very little space and employing a minimum of moving parts.

It is another object of this invention to provide a record changer in which the only record changing mechanism required above the turntable is a center post.

It is a further object of this invention to provide a record changer in which the manipulation required of an operator is reduced to a minimum.

It is still another object of this invention to provide a record changer which will not mar or disfigure the records used.

It is a still further object of this invention to provide a record changer in which the record changing cycle is rapidly completed.

It is still another object of this invention to provide a record changer which will handle a large stack of records of mixed sizes, requiring no adjustment for the different sizes.

Figure 5:
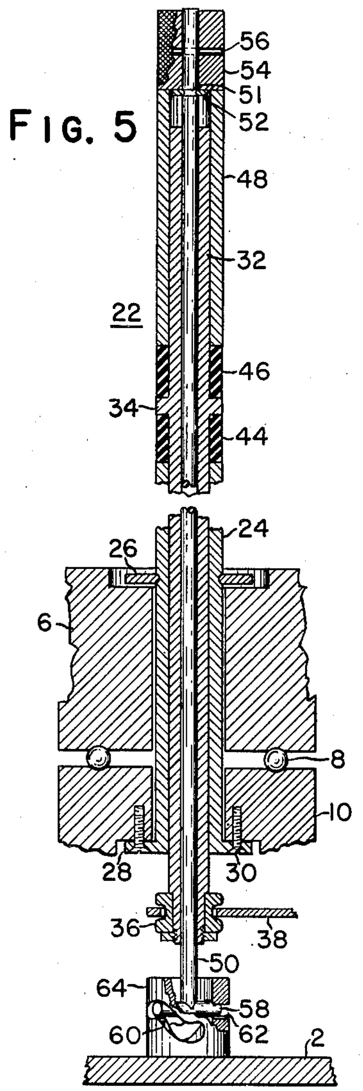
Figure 6:
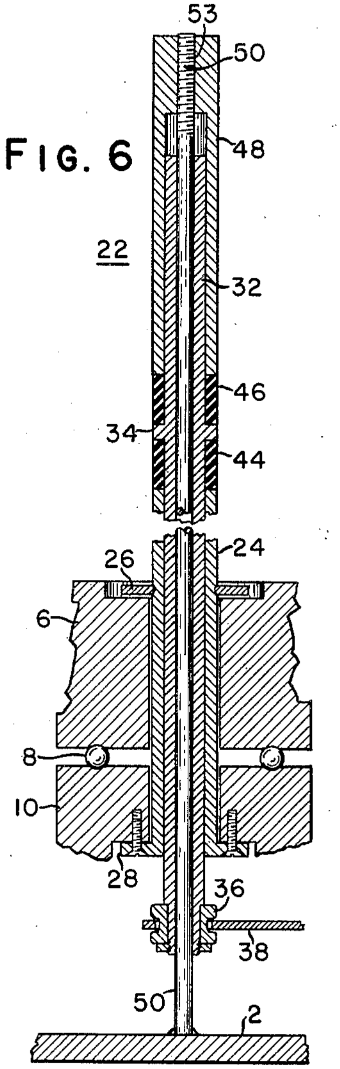

Other objects and advantages of the invention will become apparent from a consideration of the following specification when taken together with the accompanying drawings, in which:

Fig. 1 is a side view partly in section of a record changer embodying the invention;

Figs. 2, 3, 4 and 5 are side views, in cross section, of a fragment of the record changer in Fig. 1 showing the detailed construction of the center post and the relation of its various parts during different portions of the record changing cycle; and, Fig. 6 is a side view, in cross section, of a fragment of a record changer constituting a second embodiment of the invention, The objects and advantages of the invention are accomplished by a record changer in which the center post is composed of a central rod encased by a plurality of sleeves, and being provided near its central portion with a pair of spaced, deformable, rubber sleeves which are manipulated during the record changing cycle by successive compressing operations to hold a stack of records and to feed records successively from the bottom of the stack to playing position on the turntable, and which can be conditioned for the easy removal of the played stack of records by a manipulation which removes compressive stress simultaneously from both of the rubber sleeves.

Referring now more particularly to the drawings, there is shown in Fig. 1 a portion of a phonograph including a base plate 2, an upper plate 4 and a turntable 6. The turntable 6 is supported by ball bearings 8 on a bearing plate 10 which in turn is mounted by brackets 12 above the base plate 2. The turntable is driven by a motor 14 through a friction wheel 16 which bears against its inner rim. A tone arm 18 is mounted for pivotal and rotational movement about the top of a post 20 supported by the upper plate 4.

A center post 22 extends upward from and is rigidly supported by bearing plate 10. The center post 22 extends upwardly through a bore formed coaxially with the turntable 6. The center post is constructed to support a stack of records above the turntable and sufficiently removed from the same so as not to interfere with the operation of the tone arm 18. The centerpost is provided with means to be described later by which the records so supported are automatically deposited one-by-one in playing position upon the turntable during the operation of the mechanism.

Referring now more particularly to Figs. 2, 3, 4 and 5 there are shown the structural details of the center post 22 by means of which the foregoing results are accomplished. The lower, outer portion of the post 22 comprises a sleeve 24 which is formed with a flange 28 at its lower end. The flange 28 is secured to the lower side of the bearing plate 10 by any desirable means, the means shown here constituting screws 30. The turntable 6 rotates around the sleeve 24, utilizing it as an axle, the turntable being formed with an annular depression in its upper surface surrounding the sleeve 24. Secured into or against the outer surface of the sleeve 24 is a collar or washer 26 which lies within the depression 25 and prevents the turntable from undesirable upward movement along this sleeve.

Snugly housed within the sleeve 24, for axial movement with respect thereto, is a second sleeve 32. The sleeve 32 extends above the sleeve 24 and is provided with a flange or shoulder portion 34. The flange 34 is spaced above the upper end of sleeve 24 and has the same outer diameter as that sleeve. The lower end of the sleeve 32 protrudes below the lower end of sleeve 24 and is provided at its lower extremity with a pair of spaced collars 36 which may be secured thereto by any desired means. A lever 38 is provided near its end with an aperture which is somewhat larger in diameter than the sleeve 32, thus allowing the end of the lever to be placed over the lower end of the sleeve and between the collars 36, where it fits loosely enough to allow angular movement of the lever to drive the sleeve 32 up or down within the sleeve 24.

Fitting snugly within the bore of the sleeve 32 is a pin or rod 50 which extends both above and below the sleeve 32. In the portion of the rod 50 which extends above the sleeve 32 an annular groove 51 is formed into which is snapped a spring washer 52. Fitting snugly over the sleeve 32 and the upper end of rod 50 is a cup-shaped sleeve 48. This sleeve is supported upon the spring washer 52, and its length is such that its lower end terminates short of the flanges 34 on the sleeve 32 by a distance which may be the same as that between the flange 34 and the upper end of sleeve 24. Fitted between the flange 34 and upper end of sleeve 24 is a rubber sleeve-like member 34. Fitted between the flange 34 and the lower end of the sleeve 48 is a similar member 46. The end surfaces of the rubber members 44 and 46 are preferably vulcanized to the abutting surfaces of the sleeves 24 and 48 and the flange 34. The upper end of rod 50 extends above the upper end of sleeve 48 and has fitted thereover a knob 54 having the same diameter as the sleeve 48 and secured to the rod 50 by a pin 56. The lateral surface of the knob 54 is knurled for a purpose to be described later.

The lower end of the rod 50 terminates in a T 58. The ends of the T rest in arcuate oppositely directed slots 60 and 62 formed in a cylinder 64 which is rigidly supported by the base plate 2. The slots 60 and 62 act as camming means by virtue of which the rod 50 may be moved axially of the center post by rotational movement of the knob 54. The upper and lower ends of the slot 60 and 62 extend normally with respect to the axis of the rod 50, whereby when the ends of the T 58 are positioned in the extreme upper or lower terminal portions of the slots 60 and 62 the rod 50 will be restrained against axial movement with respect to the center post.

As will be seen in Fig. 1, the lever 38 is pivotally mounted on a supporting post or bracket 40 which is secured to the base plate 2. The free end of the lever 38 is mechanically linked to an automatic actuating device the operation of which is governed by the tone arm 18. This device is indicated in Fig. 1 by a dashed box 42 with mechanical linkages indicated by dotted lines extending to the free end of lever 40 and an extension 21 of the post 20 which protrudes below the upper plate 4. Since there are many automatic actuating devices known to the art which are capable of actuating the lever 38 in the manner desired in response to some predetermined relationship of the tone arm with respect to the turntable, no particular actuating mechanism is shown herein, the actuating mechanism per se constituting no part of this invention.

Such actuating mechanisms are usually constructed to be responsive to a selected one of a number of relationships between tone arm and turntable which occur near the completion of the playing of a record by the tone arm. Among these are the lateral position of the tone arm with respect to the turntable, a reversal of direction of movement of the tone arm or an acceleration of the movement of the tone arm. In referring to these relationships hereinafter they will be collectively defined as an abnormal movement of the tone arm with respect to the turntable.

Turning now to the operation of the embodiment of the invention just described, attention is directed in particular to Figs. 2, 3 and 4 which show the relationships of the various elements of the mechanism at various stages of the record changing cycle. Fig. 2 shows the relationships existing at the beginning of the cycle. Prior to stacking records on the center post the knob 54 is turned so that the T 58 rides downwardly in the slot 60 and 62 coming to rest in the lower ends thereof where it is held against upward movement by the terminal portions of the slots directed normally with respect to the axis of the rod 50. The lever 38 is so positioned at this time that the flange 34 of the sleeve 32 is separated from the top of the sleeve 24 by a distance equal to the width of the member 44, whereby that member is neither under compression nor tension, its outer diameter conforming to that of sleeve 24. However, the positioning of the rod 50 such that the T 58 lies in the lower end of the slots 60 and 62, forces down the sleeve 48 to such a degree that the member 46 is under compression between the lower end of the sleeve 48 and the flange 34 and is therefor deformed outwardly as shown in Fig. 2 forming an annular bulge in the outer surface of the center post at this point. When this relationship exists a stack of records may be placed on the upper portion of the center post where they will be supported upon the deformed member 46. Four such records 66, 68, 70, 72 are indicated in Fig. 2 as being so supported. It is obvious that many more may be accommodated, if desired.

In order to deposit a record upon the turntable in position for playing, the tone arm 18 may be turned inwardly toward the center of the turntable. This action causes the automatic actuation mechanism to raise the end of lever 38 to which it is linked, thus depressing the end of the lever which is connected to the sleeve 32. The accompanying downward movement of the sleeve 32 with its attached flange 34 removes compressive stress from the member 46 and compresses the member 44 between the flange 34 and the upper end of sleeve 24, thus causing the member to be outwardly deformed. This relationship is shown in Fig. 3. Member 46 now no longer supports the stack of records and they move downwardly until the lowermost record is supported upon the member 44 as shown in the Fig. 3. This brings the lower record 66 into coincidence with the flange 34, the record and flange being of substantially equal thickness. Now, upon moving the tone arm outwardly again into its original position, the conditions illustrated in Fig. 2 will be restored, the member 46 now being deformed outwardly against the edges of the center holes of the records 68, 70 and 72 and holding them against dropping. The member 44 now free of compressive stress, returns to its normal diameter, the lowermost record 66 being deposited upon the turntable. The relationships of the parts at this stage are shown in Fig. 4.

This action repeats itself now automatically merely by starting the turntable in motion by the usual switching means. The tone arm travels inwardly during the playing of the record and the relationships existing in Fig. 3 are re-established, thus positioning the lowermost record of the stack in coincidence with the flange 34 ready for depositing. As the automatic mechanism swings the tone arm outwardly at the termination the playing of the record, the relationships illustrated in Fig. 4 are re-established and again the lowermost record of the stack is deposited upon the turntable, the cycle continuing to repeat itself until the stack is played.

Now referring to Fig. 5 and assuming that the record playing apparatus has been shut off and it is desired to remove the stack of played records from the center post, it is only necessary to turn knob 54 until the T 58 on rod 50 rides into the upper terminations of the slots 60 and 62 where it will be held against axial movement of the rod 50 since the terminations of the slots extend normally with respect to the axis of the rod 50. This action raises the sleeve 48 by means of the washer 52, to such an extent that the member 46 is removed from compressive strain and may even be placed under slight tension if desired. The lever 38 being in its normal or neutral position, as illustrated in Figs. 2 and 4, the member 44 is not under compressive strain due to its position and may even be placed under slight tension, if desired, by allowing sufficient play between the flanges 36 and the lever 38. Thus it is insured that the center post will be of uniform diameter from top to bottom, offering no resistance to the removal of the stack of records from the turntable. Rotation of the knob to the position illustrated in Fig. 2 now conditions the center post for the reception of a fresh stack of records.

The use of the washer 52 on the rod 50 to support the sleeve 48 allows rotational movement of the knob 54 and the rod 50 to take place relative to sleeve 48, thus freeing the sleeve 48 from the necessity of partaking in the rotational movement of the rod 50 which occurs during the manipulation of the knob 54.

Fig. 6 illustrates a center post and associated mechanism comprising a second embodiment of the invention. This embodiment greatly resembles the first, departing from it in that the lower end of the rod 50 is rigidly secured to the base plate 2 and the upper end of the rod 50 is rigidly secured to the sleeve 48, the knob 54 not being employed in this embodiment. Fig. 6 shows the structure in condition for the removal of a stack of played records, the members 44 and 46 being under no compressive stress. Since the rod 50 and the sleeve 48 attached thereto cannot be positionally varied, and the sleeve 24 is prevented from movement by its attachment to the bearing plate 10, the successive compressing of the members 46 and 44 necessary to carry out the record changing cycle, must be accomplished by movement of the sleeve 32 by means of the lever 38. The normal position of the lever 38 at the start of the cycle will thus be one in which it is raised sufficiently to place the member 46 under compressive stress, thus creating the annular deformation shown in Fig. 2. The relationships existing when the tone arm is in the position corresponding to its position when a record finishes playing, are such that the lever 38 is depressed into its lowermost position, thus outwardly deforming the member 44 in the manner shown in Fig. 3. In order to achieve the relationships illustrated in Fig. 6, in which the center post is conditioned for the removal of the played stack of records, it will be necessary to provide some hand-operative means for bringing the end of the lever 38 from its normal or uppermost position to a central or neutral location such as illustrated. No such means is shown since many such conventional means exist in the art. The spacing of the ends of the sleeves 24 and 48 with respect to the flange 34 and the width of the members 46 and 44 may be such that when the lever is in the neutral position illustrated in Fig. 6 the members 46 and 44 are under a slight tension. This will insure that the diameter of the members does not exceed that of the sleeves 24 and 48.

While the disclosure of the invention has been restricted to those embodiments which are now preferred, many variations of form and arrangement falling within the scope of the invention as defined by the appended claims, will occur to those skilled in the art. It is, therefore, to be understood that the scope of the invention is not to be considered as limited to the embodiments disclosed herein.

What is claimed is:

1. In a phonographic record player having a turntable, a tone arm and an actuating means responsive to an abnormal movement of said tone arm with respect to said turntable; a turntable center post, said post comprising a central rod, a first sleeve fitted over said rod and slidable therealong, an annular flange on said sleeve, said flange being integral with said sleeve, a second sleeve fitted over the lower portion of said first sleeve below said flange and relatively axially movable with respect thereto, said second sleeve being fixed with respect to said record player, the upper end of said second sleeve being spaced from said flange, a third sleeve of inverted, cup-shaped form and having its lower portion fitted over the upper end of said first sleeve for relative axial movement with respect thereto, the upper end of said rod extending through the cupped portion of said third sleeve, means co-acting with said rod and said third sleeve to cause said third sleeve to partake of any upward movement of said rod, the lower end of said sleeve being spaced from said flange, a first resilient, annular member fitted over said first sleeve between said flange and the lower end of said third sleeve and having its ends bonded to said flange and the lower end of said third sleeve, a second resilient, annular member fitted over said first sleeve between said flange and the upper end of said second s eeve, the ends of said second member being bonded to said flange and the upper end of said second sleeve, a knob secured to the upper end of said rod above said third sleeve for rotation therewith, means co-acting with the lower end of said rod whereby rotation of said rod in opposite directions produces axial movement of said rod with respect to said sleeve in opposite directions, and means co-acting with said first sleeve, said last named means being actuated by said actuating means in response to an abnormal movement of said tone arm with respect to said turntable, and imparting axial movement in opposite directions to said first sleeve relative to said second sleeve in accordance with the movement of said tone arm with respect to said turntable.

2. In a phonographic record player, a turntable center post, said post comprising a central rod, a first sleeve fitted over said rod and slidable therealong, an annular flange on said sleeve, said flange being integral with said sleeve, a second sleeve fitted over the lower portion of said first sleeve below said flange and relatively axially movable with respect thereto, said second sleeve being fixed with respect to said record player, the upper end of said second sleeve being spaced from said flange, a third sleeve of inverted cup-shaped form and having its lower portion fitted over the upper end of said first sleeve for relative axial movement with respect thereto, the upper end of said rod extending through the cupped portion of said third sleeve, means co-acting with said rod and said third sleeve to cause said third sleeve to partake of any upward movement of said rod, the lower end of said sleeve being spaced from said flange, a first resilient annular member fitted over said first sleeve between said flange and the lower end of said third sleeve, and having its ends bonded to said flange and the lower end of said third sleeve, a second resilient annular member fitted over said first sleeve between said flange and the upper end of said second sleeve, the ends of said second member being bonded to said flange and the upper end of said second sleeve, a knob secured to the upper end of said rod above said third sleeve for rotation therewith, means co-acting with the lower end of said rod whereby rotation of said rod in opposite directions produces axial movement of said rod with respect to said sleeve in opposite directions and means co-acting with said first sleeve for imparting axial movement in opposite directions to said first sleeve relative to said second sleeve.

3. In a phonographic record player having a turntable, a tone arm, and an actuating means responsive to an abnormal movement of said tone arm with respect to said turntable; a turntable center post comprising a central rod, the lower end of said rod being fixed with respect to said record player, a first sleeve fitted over said rod and slidable therealong, an annular flange on said sleeve, said flange being integral with said sleeve, a second sleeve fitted over the lower portion of said first sleeve below said flange and relatively axially movable with respect thereto, said second sleeve being fixed with respect to said record player, the upper end of said second sleeve being spaced from said flange, a third sleeve of inverted cup-shaped form and having its lower portions fitted over the upper end of said first sleeve for relative axial movement with respect thereto, the upper end of said rod being secured to the cupped portion of said third sleeve, whereby said third sleeve is fixed with respect to said record player, the lower end of said third sleeve being spaced from said flange, a first resilient annular member fitted over said first sleeve between said flange and the lower end of said third sleeve and having its ends bonded to said flange and the lower end of said third sleeve, a second resilient annular member fitted over said first sleeve between said flange and the upper end of said second sleeve, the ends of said second member being bonded to said flange and the upper end of said second sleeve, and means co-acting with said first sleeve for imparting axial movement thereto in opposite directions, said last named means being actuated by said actuating means and imparting said movement in response to the movement of said tone arm with respect to said turntable.

4. In a phonographic record player, a turntable center post, said post comprising a central rod, a first sleeve fitted over said rod and slidable therealong, an annular flange on said sleeve, said flange being integral with said sleeve, a second sleeve fitted over the lower portion of said first sleeve below said flange and relatively axially movable with respect thereto, said second sleeve being fixed with respect to said record player, the upper end of said second sleeve being spaced from said flange, a third sleeve of inverted cup-shaped form and having its lower portion fitted over the upper end of said first sleeve for relative axial movement with respect thereto, the upper end of said rod being secured to the cupped portion of said third sleeve, whereby said third sleeve is fixed with respect to said record player, the lower end of said sleeve being spaced from said flange, a first resilient annular member fitted over said first sleeve between said flange and the lower end of said third sleeve, and having its ends bonded to said flange and the lower end of said third sleeve, a second resilient annular member fitted over said first sleeve between said flange and the upper end of said second sleeve, the ends of said second member being bonded to said flange and the upper end of said second sleeve, and means co-acting with said first sleeve for imparting axial movement in opposite directions to said first sleeve relative to said second sleeve.

GEORGE A. EXLEY.

REFERENCES CITED

The following references are of record in the file of this patent:

UNITED STATES PATENTS

| Number | Name | Date |
|---|---|---|
| 1,568,130 | Blackwell | Jan. 5, 1926 |

FOREIGN PATENTS

| Number | Country | Date |
|---|---|---|
| 822,026 | France | May 20, 1937 |
| 55,603 | Netherlands | Oct. 16, 1943 |
| 62,822 | Denmark | Oct. 23, 1944 |